United States Patent [19]

Morimoto

[11] Patent Number: 5,574,603
[45] Date of Patent: Nov. 12, 1996

[54] MAGNETIC TAPE RECORDING AND PLAYBACK DEVICE WITH SPRING ACTUATED HEAD PLACEMENT

[75] Inventor: Takao Morimoto, Hyogo, Japan

[73] Assignee: Mitsubishi Denki Kabushiki Kaisha, Tokyo, Japan

[21] Appl. No.: 408,844

[22] Filed: Mar. 23, 1995

Related U.S. Application Data

[62] Division of Ser. No. 229,771, Apr. 19, 1994.

[30] Foreign Application Priority Data

Apr. 20, 1993 [JP] Japan ..................... 5-093134

[51] Int. Cl.⁶ ............................. G11B 5/008; G11B 5/54
[52] U.S. Cl. ............................................. 360/105; 360/93
[58] Field of Search ........................... 360/105, 90, 93, 360/96.3, 96.5, 96.6; 242/358

[56] References Cited

U.S. PATENT DOCUMENTS

| | | | |
|---|---|---|---|
| 4,404,610 | 9/1983 | Koizumi et al. | 360/105 |
| 4,470,087 | 9/1984 | Sakamoto et al. | 360/105 |
| 4,554,605 | 11/1985 | Saito et al. | 360/96.1 |
| 4,674,001 | 6/1987 | Takahashi et al. | 360/105 |
| 4,723,236 | 2/1988 | Kitami | 360/93 |
| 5,349,488 | 9/1994 | Shibata et al. | 360/105 |

FOREIGN PATENT DOCUMENTS

| | | |
|---|---|---|
| 60-113349 | 6/1985 | Japan . |
| 62-236163 | 10/1987 | Japan . |
| 43580 | 1/1992 | Japan . |

OTHER PUBLICATIONS

Patent Abstracts of Japan, P-399, vol. 9, No. 265, Oct. 23, 1985, (JP60-113349).

*Primary Examiner*—Stuart S. Levy
*Assistant Examiner*—David L. Ometz
*Attorney, Agent, or Firm*—Birch, Stewart, Kolasch & Birch, LLP

[57] ABSTRACT

In a magnetic tape recording and playback device, a resilient body is engaged with a head base. At the time of recording and playing back a tape, the head base is pressed and fixed when the resilient member is directly pushed by a drive plate, and at the time of withdrawing the head, the head base driven by the drive plate, through the resilient member, and the head base is pressed and fixed. In this way, a force given to the resilient body is reduced at the time of head base movement. It is possible to reduce the required head base drive force at the time of head base movement.

7 Claims, 8 Drawing Sheets

PRIOR ART

MAGNETIC TAPE RECORDING AND PLAYBACK DEVICE WITH SPRING ACTUATED HEAD PLACEMENT

This application is a divisional of copending application Ser. No. 08/229,771, filed on Apr. 19, 1994, pending, the entire contents of which are hereby incorporated by reference.

BACKGROUND OF THE INVENTION

The present invention relates to a cassette type tape recorder to which a tape cassette accommodating a magnetic tape is applied, and more particularly relates to a mechanism by which a magnetic head is pulled out and withdrawn.

FIGS. 11 and 12 are plan views showing a conventional magnetic tape recording and playback device disclosed, for example, in Japanese Unexamined Patent Publication No. 60-113349. FIG. 11 is a view showing the condition of withdrawal, and FIG. 12 is a view showing the condition of advance in the case where the tape is recorded and played back.

Next, the operation will be explained as follows.

FIGS. 11 and 12 show a mechanism for moving a magnetic head mounting plate 102 from a withdrawal position (stopping position) to an advance position (acting position). A drive gear 189 is attached onto the reverse side of a primary base plate (not shown in the drawing) close to a gear 138. This drive gear 189 includes: a resting section 190 in which a portion of the gear is cut away; a spring receiving protruding section 191 formed on the upper surface side; a spiral rotary cam 192 provided on the lower surface side; and a stopping time engaging section 193 also provided on the lower surface side. A stopper wall 194 is protruded from a lower surface peripheral section of the drive gear 189. Further, an acting time engaging section 195 is protruded at a position close to the stopping time engaging section 193.

In this connection, a movable iron core 110a of a magnet plunger 110 is pushed in the extended direction by a coil spring 110b at all times. When a solenoid is energized with current due to the insertion of a cassette, the movable iron core 110a is withdrawn into the solenoid. In the drawings, numeral 196 is an engagement lever, one end of which is a cam engaging section 196a, and the other end of which is a plunger engaging section 196b. The plunger engaging section 196b is engaged with a fore end portion of the movable iron core 110a of the magnet plunger 110, and the cam engaging section 196a is disposed along the lower surface of the rotary cam 192. In the drawings, numeral 197 is a leaf spring (a rod spring may be used), the free end of which comes into pressure contact with the spring receiving protruding section 191 so that a torque is given to the drive gear 189 to rotate it counterclockwise in the drawings.

Further, in the drawing, numeral 198 is a cam lever, which is rotatably pivoted on the reverse side of the primary base plate. At one end of the cam lever 198, a cam follower 198a is provided coming into contact with the cam surface of the rotary cam 192. A rod spring 199, the modulus of elasticity of which is high, is attached to this cam lever 198, and a fore end portion of this rod spring 199 is engaged with a portion of the magnetic head mounting plate 102. In this connection, numeral 200 is a tension spring for returning the magnetic head mounting plate 102 from the acting position to the stopping position. By the resilient force of this tension spring 200, the cam follower 198a is pressed onto the cam surface of the rotary cam 192.

Therefore, at the stopping time, as illustrated in FIG. 12, the cam engaging section 196a of the engaging lever 196 is engaged with the stopping time engaging section 193, and the resting section 190 is opposed to the gear 138. A resilient force of the leaf spring 197 is activated on the spring receiving protruding section 191, so that a torque is given to the drive gear 189 to rotate it counterclockwise in the drawing. The cam follower 198a is located at a position where the radius of the rotary cam 192 is minimum. Consequently, the magnetic head mounting plate 102 is maintained at the withdrawal position (stopping position) by the action of the tension spring 200.

When a tape cassette is inserted into the device under the above condition, the solenoid of the magnet plunger 110 is energized with current, and the engaging lever 196 is rotated by the operation of the movable iron core 110a, so that the cam engaging section 196a is released from the stopping time engaging section 193, and the drive gear 189 is slightly rotated by the action of the leaf spring 197 and meshed with the gear 138. Therefore, the rotation of the gear 138, that is, the rotation of the motor is transmitted to the drive gear 189, and the drive gear 189 is rotated clockwise approximately by one revolution. During the rotation of the drive gear 189, the cam follower 198a is moved to the maximum radius portion of the rotational cam 192, and the cam lever 198 is greatly rotated, so that the magnetic head mounting plate 102 is moved to an advance position, resisting a force of the tension spring 200 (shown in FIG. 12). At this time, the cam engaging section 196a is engaged with the acting time engaging section 195, so that the drive gear 189 is stopped. However, the resting section 190 is opposed to the gear 138 again, and the leaf spring 197 comes into pressure contact with the spring receiving protruding section 191. Therefore, a torque is given to the drive gear 189 so as to rotate it counterclockwise. The device is maintained under the above condition.

In order to provide a stopping condition, an electric current supplied to the magnet plunger 110 may be stopped. Simultaneously when the electric current is stopped, the movable iron core 110a returns to the extended direction, and the cam engaging section 196a of the engaging lever 196 is released from the acting time engaging section 195. Therefore, the drive gear 189 is a little rotated by the action of the leaf spring 197, and the cam follower 198a drops to the minimum radius section of the rotary cam 192. Accordingly, the head panel 102 is returned to the stopping position by the action of the return spring 200.

In this connection, there is provided a mechanism (not shown in the present drawing); but illustrated in J60-113349 by which the rotary plates, are rotated and linked with the withdrawal motion of the magnetic head mounting plate 102, so that the right and left gears are separated from the adjacent gears. Therefore, simultaneously when the magnetic head mounting plate 102 is returned to its original position, the torque transmission path from the motor to both reel shafts, is interrupted.

Whereas the conventional magnetic tape recording and playback device is constructed in the above manner, the head mounting base plate is pulled in the withdrawal direction at all times, and when the head mounting base plate is advanced, its advancing direction is the same as the extending direction of the spring used for withdrawal of the head mounting base plate. Consequently, the more the head mounting base plate is pulled out, the more the pulling force to pull out the head mounting base plate is increased. When the head mounting base plate is pulled out, it is necessary to resist the force of the spring used for withdrawing the head mounting base plate. Accordingly, it is necessary to provide a spring having a very high modulus of elasticity. Therefore, in the case of tape recording and playback, it is necessary to pull out and hold the magnetic head mounting base plate, resisting the maximum spring force which includes the maximum tension of the head mounting base plate withdrawal spring, and the spring force corresponding to the deflection of the head mounting base plate pulling spring. The conventional device has the above problems.

SUMMARY OF THE INVENTION

The present invention has been achieved to solve the above problems. It is an object of the present invention to provide a magnetic tape recording and playback device characterized in that: the head mounting base plate drive springs are integrated into one unit; a spring force can be individually given in each case of the time of tape recording and playback and the time of head withdrawal; and the spring force can be determined to a minimum in the movement of the head mounting base plate such as advance and withdrawal of the head, so that the drive force of the head mounting base plate can be reduced.

The present invention provides a magnetic tape recording and playback device comprising: a head base to which a magnetic head is attached for recording and playing back a cassette tape, the head base being capable of moving on a main base; a resilient body provided on the head base; and a lever having two ends, the first end of which is engaged with a groove formed on a disk-shaped cam for moving the head base, and the second end of which is engaged with the head base directly or through the resilient body.

Also, the present invention provides a magnetic tape recording and playback device comprising: a head base to which a magnetic head is attached for recording and playing back a cassette tape, the head base being capable of moving on a main base; a drive plate having two ends, the first end of which is engaged with a groove formed on a disk-shaped cam provided on the main base for moving the head base, the drive plate being capable of moving in a radial direction of the disk-shaped cam when the groove is moved; and a resilient body engaged with both the drive plate and head base at two points located in the movement direction.

Also, the present invention provides a magnetic tape recording and playback device comprising: a head base to which a magnetic head is attached for recording and playing back a cassette tape, the head base being capable of moving on a main base; a resilient body provided on the head base; and a lever, having two ends, the first end of which is engaged with a groove formed on a disk-shaped cam, the groove being used for moving the head base, and the second end of which is engaged with the head base through the resilient body.

According to the present invention, in the case where the head is withdrawn, when the second end of the lever directly engages with the head base and pushes it, the head base is pushed in a direction in which the head being separated from the attached cassette tape, and at the same time one end of the resilient body engages with the engaging portion on the main base, so that a resilient force is given in a direction opposite to the direction in which the head is separated from the attached cassette tape. In the case of tape recording and playback, the second end of the lever pushes the head base through the resilient body in a direction in which the attached cassette tape is pressed, and during an interval between the time of head withdrawal and the time of recording and playing back a tape, the pushing force is reduced.

Also, according to the present invention, in the case of head withdrawal, when the lever is moved in the radial direction, the resilient body pushes the head base in a direction in which the head is separated from the cassette tape attached to the head base. In the case of tape recording and playback, the resilient body pushes the head in a direction in which the head is pressed against the attached cassette tape when the lever is moved in the radial direction and also moved in the opposite direction, and during an interval between the time of head withdrawal and the time of recording and playing back a tape, the pushing force is reduced.

According to the present invention, in the case of head withdrawal, the second end of the lever is engaged with the head base through the resilient body so that the head base is pushed. Therefore, the head base is pushed in a direction in which the head is separated from the attached cassette tape while a reaction force corresponding to the pushing force is being given by the resilient body. In the case of tape recording and playback, when the second end of the lever pushes the head base through the resilient body, the head is pressed against the attached cassette tape while a reaction force corresponding to the pushing force is being given by the resilient body, and the pushing force is reduced during an interval between the time of head withdrawal and the time of recording and playing back a tape.

BRIEF DESCRIPTION OF THE DRAWINGS

FIG. 10(*b*) is an overall view of the inventive portion.

DETAILED DESCRIPTION OF THE PREFERRED EMBODIMENTS

Embodiment 1

Figure 1:
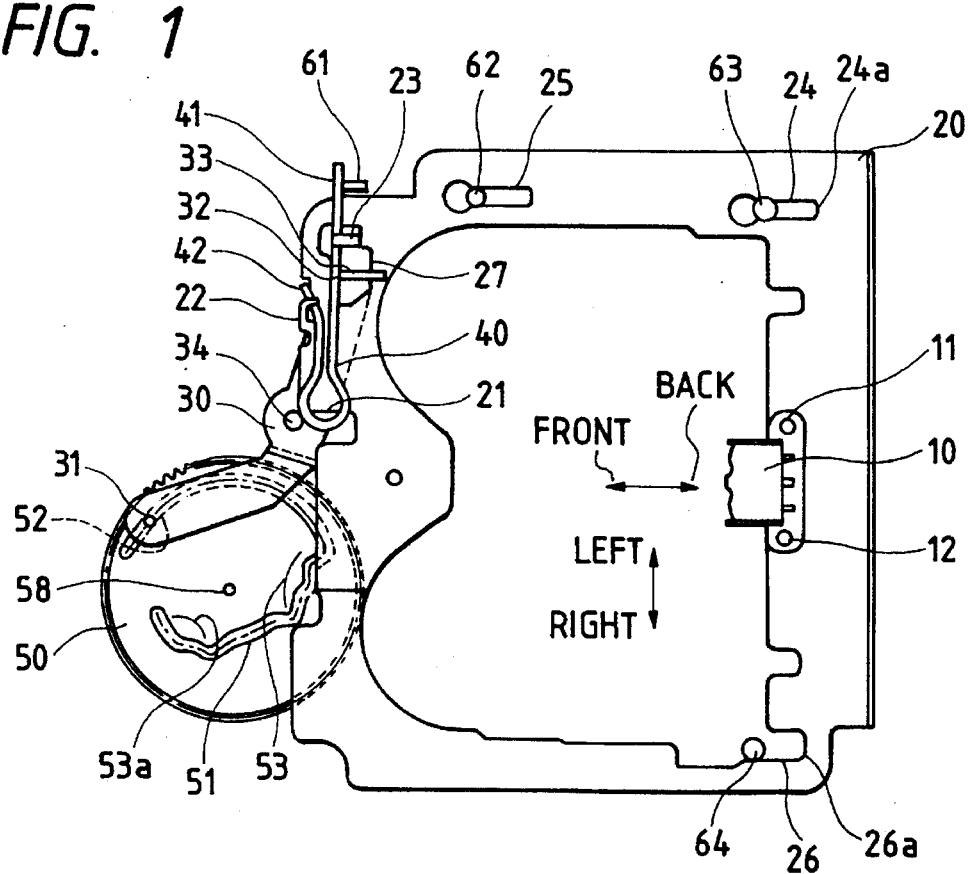
FIG. 1 is a view showing the condition of head withdrawal of the magnetic tape recording and playback device of an embodiment of the present invention.
Figure 2:
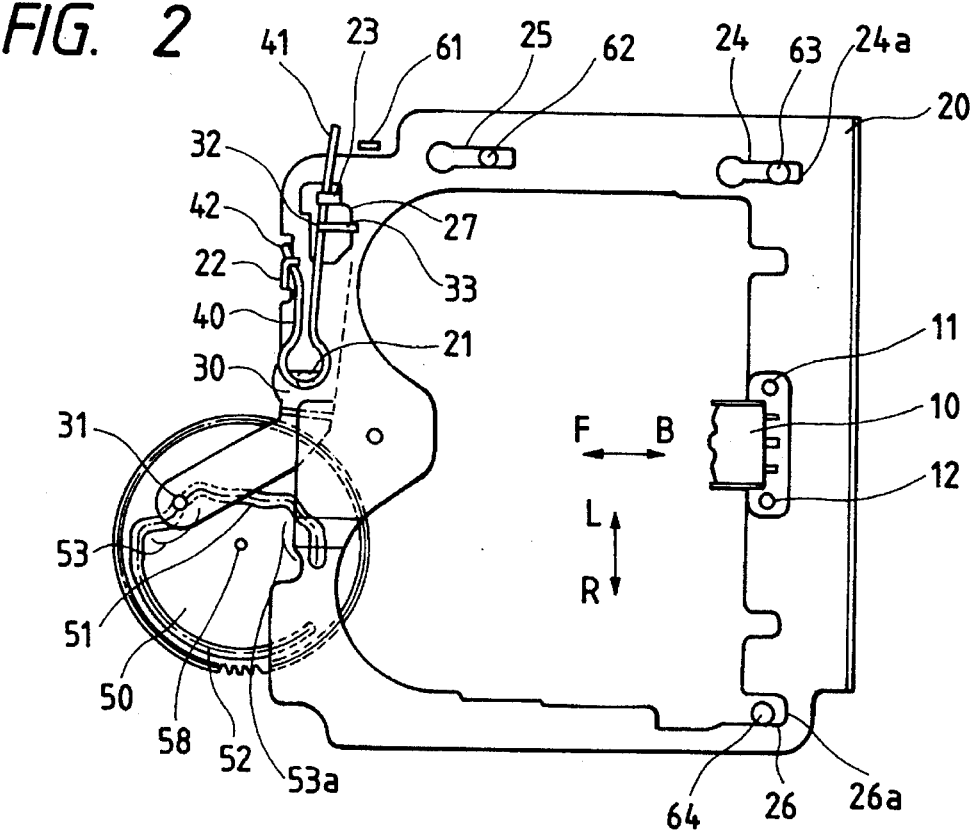
FIG. 2 is a view showing the condition of head movement of the magnetic tape recording and playback device of an embodiment of the present invention.
Figure 3:
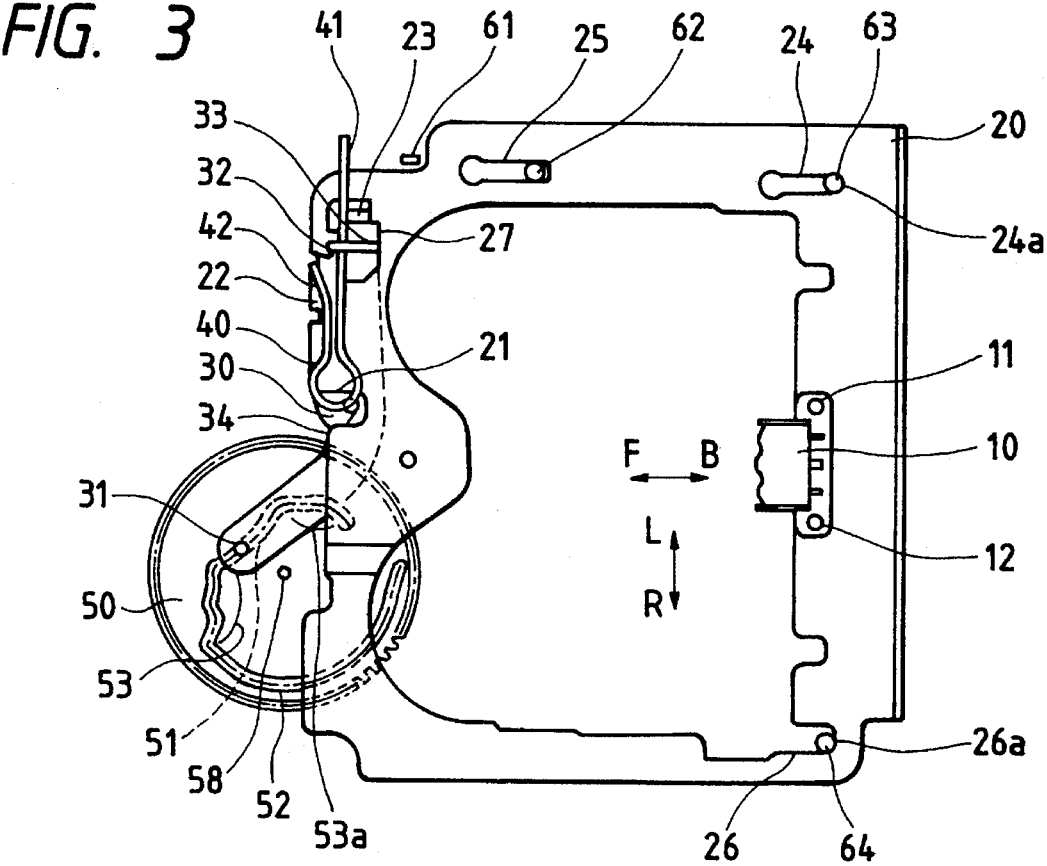
FIG. 3 is a view showing the condition of tape recording and playing back of the magnetic tape recording and playback device of an embodiment of the present invention.
Figure 10A:
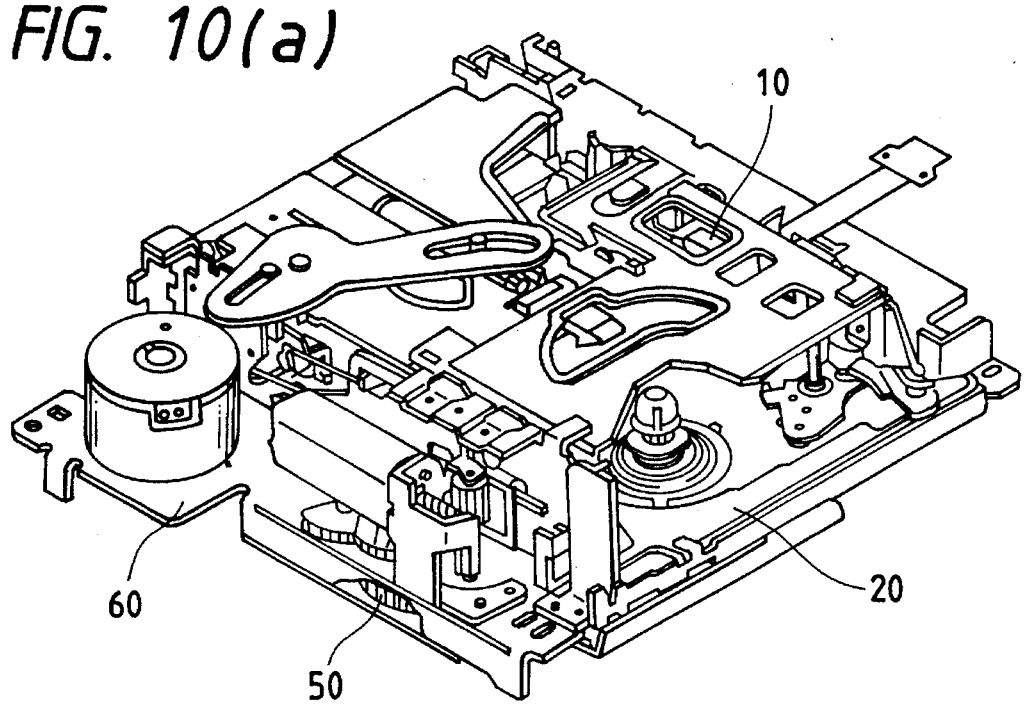
FIG. 10(*a*) is an overall arrangement view of an embodiment of the magnetic tape recording and playback device of the present invention.
Figure 10B:
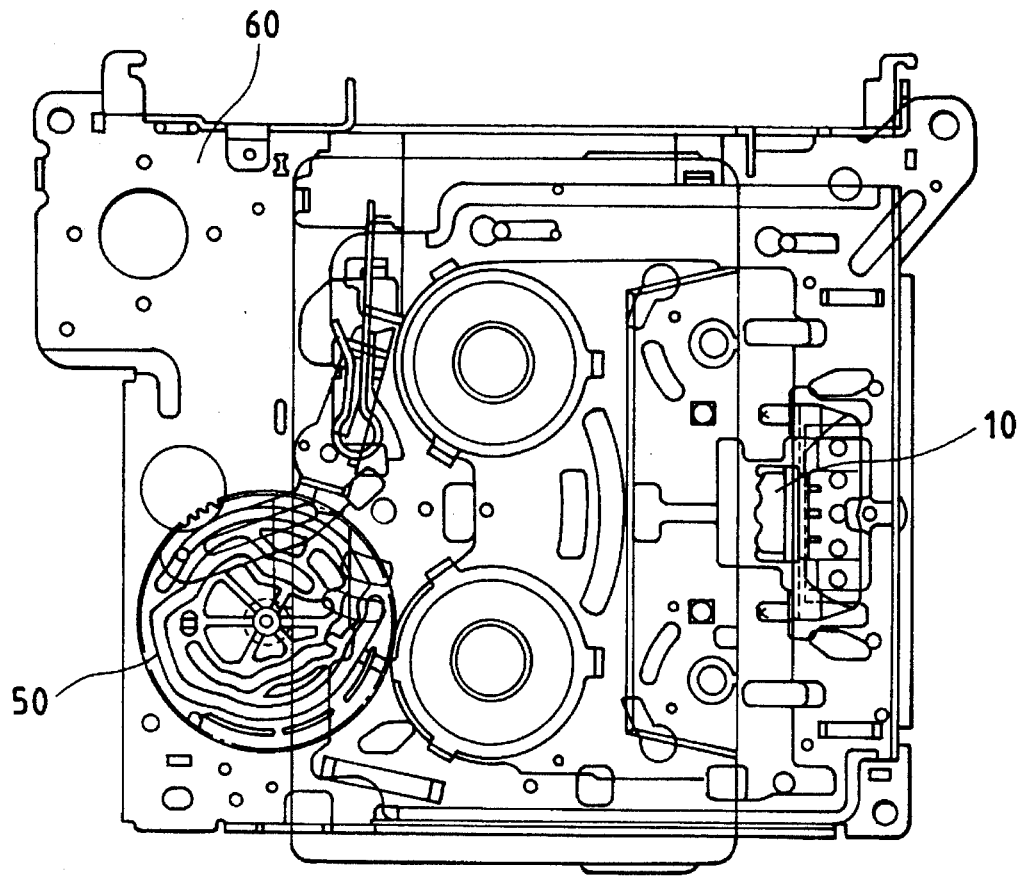
Figure 11:
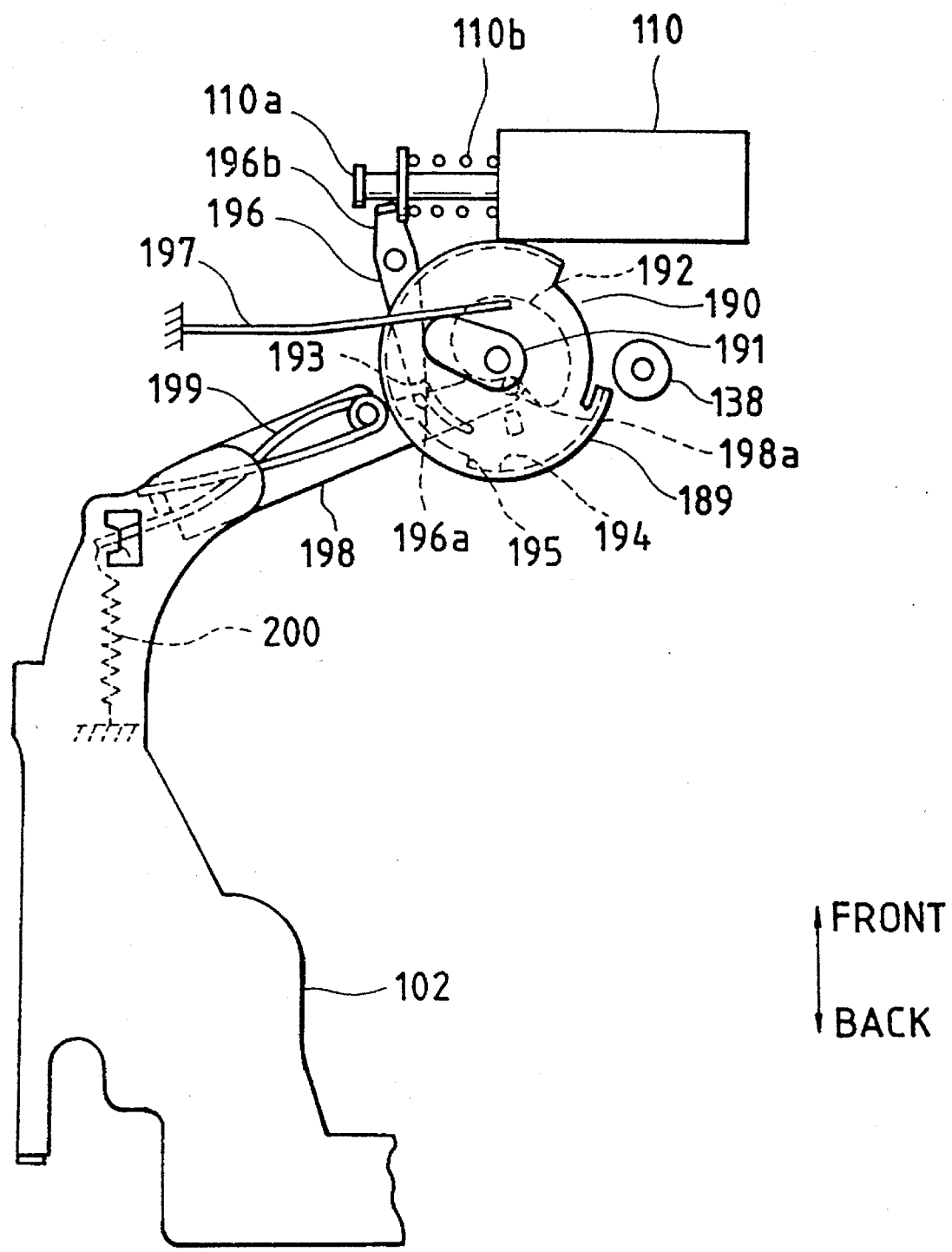
FIG. 11 is a view showing the condition of head withdrawal of a conventional magnetic tape recording and playback device.
Figure 12:
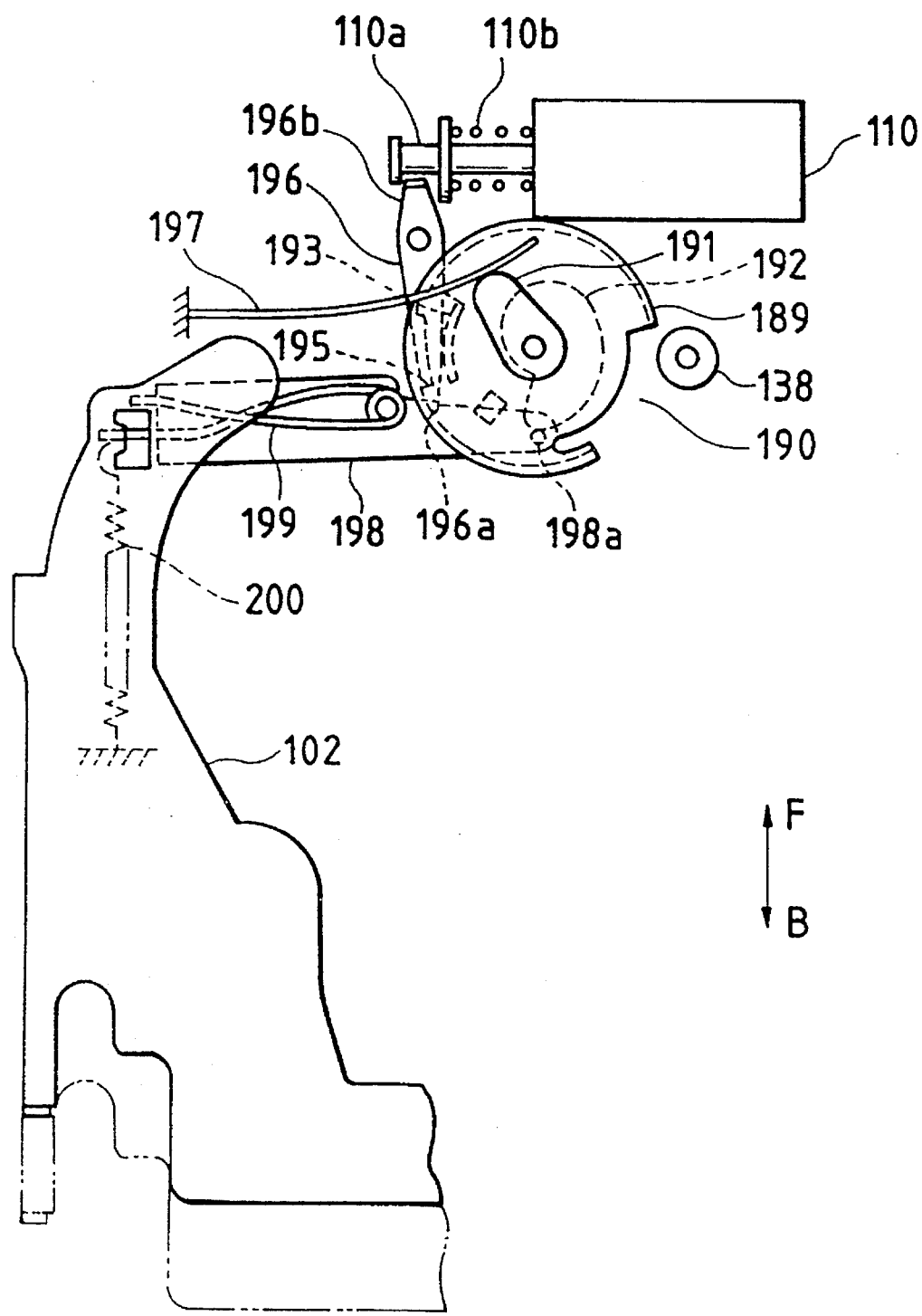
FIG. 12 is a view showing the condition of tape recording and playing back of the conventional magnetic tape recording and playback device.

FIG. 10(a) is an overall perspective view of the magnetic tape recording and playback device of the present invention. FIG. 10(b) is a plan view showing the entire inventive portion. FIGS. 1, 2 and 3 are plan views showing an embodiment of the present invention. FIG. 1 shows a withdrawal condition of the head, FIG. 2 shows a movement condition of the head, and FIG. 3 shows a recording and playback condition of the head. In the drawings, numeral 10 is a magnetic head (also referred to as a head), numeral 20 is a magnetic head mounting base plate (also referred to as a head base), numerals 11, 12 are engaging members for engaging the magnetic head 10 with the magnetic head mounting base plate 20, numerals 21, 22, 23 denote a spring hook integrated with the magnetic head mounting base plate 20, numerals 24, 25, 26 are sliding guide holes formed in the longitudinal direction of the magnetic head mounting base plate 20, numerals 24a, 26a are advance stopper sections of the magnetic head mounting base plate, numeral 27 is an end surface for driving the magnetic head mounting base plate, numeral 30 is a drive lever of the magnetic head mounting base plate (the drive lever is also referred to as a lever), numeral 31 is a pin vertically provided on the drive lever 30, numeral 32 is a lever end surface A which is a contact portion where the drive lever 30 and spring 40 are contacted, numeral 33 is a lever end surface B which is a contact portion between the drive lever 30 and the end surface 27 of the magnetic head mounting base 20, numeral 34 is a rotary shaft of the drive lever 30, numeral 40 is a spring for pressing the magnetic head mounting base plate (the spring is also referred to as a resilient body), numeral 41 is a fore end portion of the spring in the longitudinal direction, numeral 42 is a spring portion hooked by the spring hook 22, numeral 50 is a disk-shaped rotary cam gear having a cam groove (the disk-shaped rotary cam gear is also referred to as a disk-shaped cam), numeral 51 is a groove portion used for recording and playing back of a magnetic tape, numeral 52 is a groove portion for withdrawing the magnetic tape, numerals 53, 53a are groove portions for moving the head, numeral 60 is a deck base (the deck base is also referred to as a main base), numeral 61 is a plate member vertically provided on the deck base for engaging the spring used for pressing the head base plate mounting base, and numerals 62, 63, 64 are guide pins for guiding the magnetic head mounting base plate 20.

In the magnetic tape recording and playback device constructed in the manner described above, in the case where the head is in the withdrawal condition as shown in FIG. 1, the center of the drive lever 30 is regulated by the rotary shaft 34, and the pin 31 vertically provided on the drive lever is engaged with and regulated by the groove portion 52 for withdrawing the head of the rotary cam gear 50, so that the position of the drive lever 30 can be determined. At this time, the lever end surface B 33 comes into contact with the end surface 27 for driving the magnetic head mounting base plate, so that the position of the magnetic head mounting base plate 20 can be regulated in the advance direction. At this time, the position of the spring 40 is regulated with respect to the plane and height directions by the hooks 21, 22, and the height of the spring 40 is regulated by hook 23 so that the spring 40 is previously pushed in the opening direction. The fore end portion 41 of this spring 40 is engaged with and pressed by the plate member 61 vertically provided on the deck base. Therefore, the magnetic head mounting base plate 20 is pushed in the advance direction.

Also, the position of the magnetic head mounting base plate 20 is regulated in the transverse direction by the action of the guide grooves 24, 25, 26.

As a result of the foregoing, the position of the magnetic head mounting base plate 20 is regulated and fixed. Under the condition described above, the pin 31 gives a load to the groove 52 of the gear 50 in the direction of the gear center 58.

Next, the head movement condition shown in FIG. 2 will be explained as follows.

When the drive motor and drive gear (not shown) are rotated in the condition shown in FIG. 1, the rotary cam gear 50 is rotated counterclockwise. In this way, the condition shown in FIG. 1 is changed to the condition shown in FIG. 2. When the rotary cam gear 50 is rotated in this way, the drive lever 30 is rotated counterclockwise, and the head mounting base plate 20 advances.

In FIG. 2, when the pin 31 vertically provided on the drive lever is engaged with and regulated by the groove 53 for moving the head of the rotary cam gear 50, the position of the drive lever 30 can be determined.

At this time, the spring 40 previously pushed in the opening direction is regulated and fixed by the spring hook 23 integrated with the magnetic head mounting base plate. Further, the lever surfaces A32 and B33 of the lever 30 are provided in an engaging portion by the action of the fixed spring 40 and the end surface 27 for driving the magnetic head mounting base plate. Therefore, the position of the magnetic head mounting base plate 20 can be regulated in the transverse direction.

As described above, the lever 30 is provided in an engaging portion by the action of the spring 40 and the magnetic head mounting base plate drive end surface 27. Therefore, under the above condition (in the section between the head withdrawal and the movement, and also in the section between the movement and the recording and playback), the load given to the lever 30 can be minimized, and further the rotational load given to the rotary cam gear 50 can be minimized.

Next, the tape recording and playing back condition shown in FIG. 3 will be explained.

When the drive motor and drive gear (not shown) are rotated in the condition shown in FIG. 2 (or FIG. 1), the rotary cam gear 50 is rotated counterclockwise. In this way, it is changed to the tape recording and playback condition shown in FIG. 3. When the rotary cam gear 50 is rotated, the drive lever 30 is rotated counterclockwise, and the head mounting base plate 20 is advanced.

In FIG. 3, when the pin 31 vertically provided on the drive lever is engaged with and regulated by the tape recording and playback groove portion 51 of the rotary cam gear 50, the drive lever 30 can be positioned. At this time, the magnetic head mounting base plate stoppers 24a, 26a come into contact with the guide pins 63, 64, so that the advancing motion of the magnetic head mounting base plate 20 is stopped, and the spring 40 engaged with this magnetic head mounting base plate 20, previously pushed to the opening direction, is pushed to the closing direction by the action of the lever end surface A 32. Therefore, the magnetic head mounting base plate 20 is set in a tape recording and playback condition in which the base plate 20 is pushed forward and fixed. Since the lever 30 is pushed forward, the rotary cam gear 50 impresses a force in the outer circumferential direction with respect to the gear center 58, so that the rotary cam gear 50 works as a rotational load.

Embodiment 2

Figure 4:
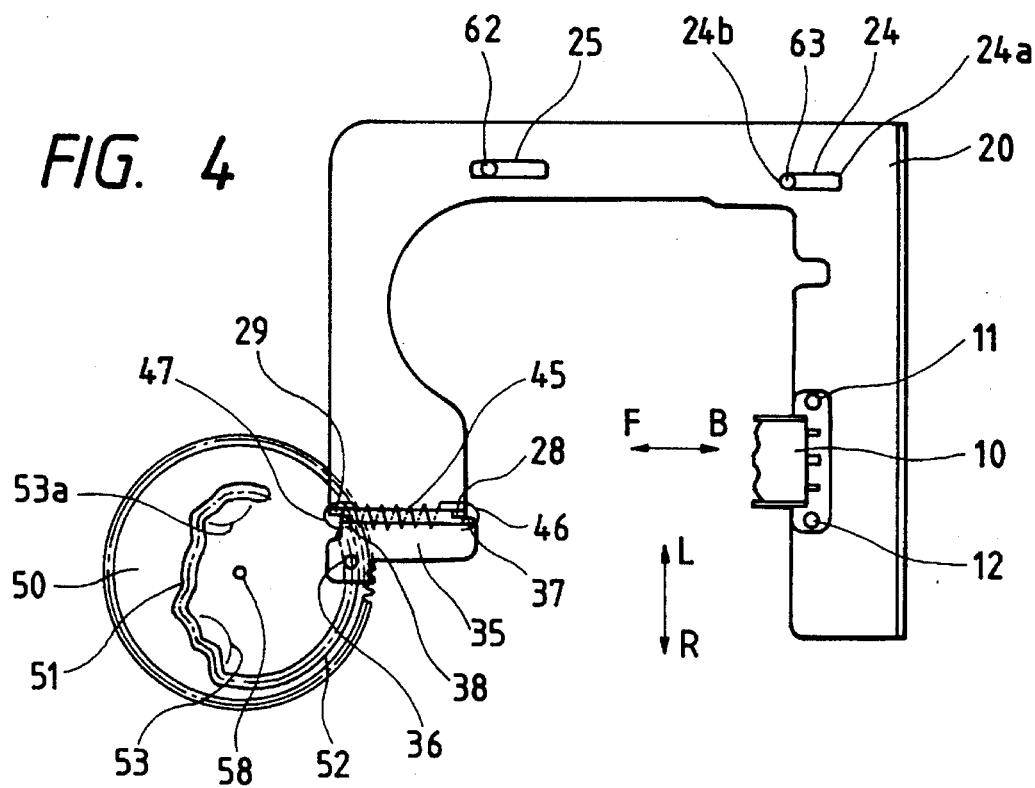
FIG. 4 is a view showing the head withdrawal condition of another embodiment of the present invention.

FIG. 4 is a plan view showing another embodiment. Numerals 10 to 12, 20 to 24, 24*a*, 25, 50 to 53, 53*a*, 58, 60, 62 and 63 are the same as those shown in Embodiment 1. Numeral 24*b* is a withdrawal stopper of the magnetic head mounting base plate 20, numeral 28 is a base plate spring hook A of the magnetic head mounting base plate 20, numeral 29 is a base plate spring hook B of the magnetic head mounting base plate 20, numeral 35 is a drive plate, numeral 36 is an engaging pin to engage with the cam groove of the rotary cam gear 50, the engaging pin 36 being vertically provided on the drive plate 35, numeral 37 is a plate spring hook A of the drive plate 35, numeral 38 is a plate spring hook B of the drive plate, and numeral 45 is a tension spring, one hook of which is engaged with both the base plate spring hook A 28 and the plate spring hook A 37 which are adjacent to each other, and the other hook of which is engaged with both the base plate spring hook B 29 and the plate spring hook 38 which are adjacent to each other, so that the tension spring 45 is provided between the hooks.

Under the head withdrawal condition shown in FIG. 4, the drive plate 35 can push the magnetic head mounting base plate 20 in the withdrawal direction when the drive plate 35 is fixed by the rotary cam gear 50 at a position which is more withdrawn than the base plate spring hooks A 28 and B 29 adjacent to the plate spring hooks A 37 and B 38. At this time, the magnetic head mounting base plate 20 which is pushed is fixed when the withdrawal stopper 24 comes into contact with the guide pin 63. In this condition, the rotary cam gear 50 is given a force by the engaging pin 36 in the direction of the gear rotational center 58, so that the given force becomes a rotational load.

Figure 5:
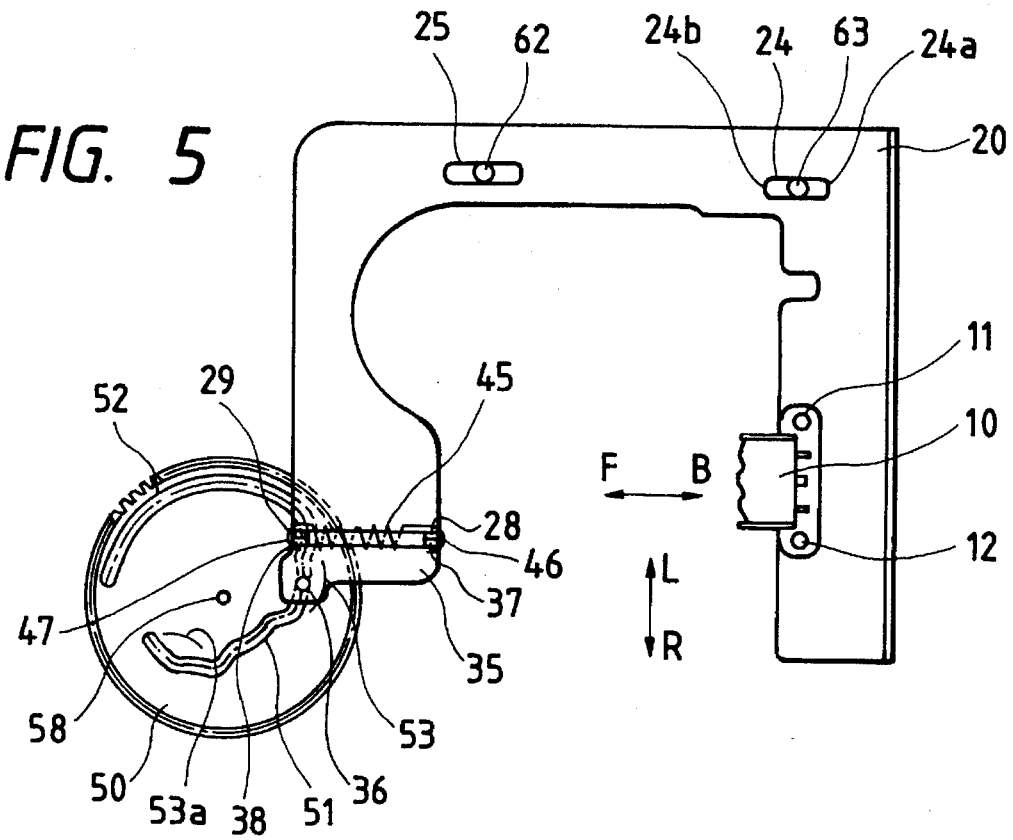
FIG. 5 is a view showing the condition of head movement of another embodiment of the present invention.

Under the condition shown in FIG. 5 in which the head is moved, the longitudinal position of the magnetic head mounting base plate 20 is not regulated by the guide pin. Therefore, the spring hooks adjacent to each other are arranged at the same position by the action of the tension spring 45, so that no load is given to the rotary cam gear 50. Accordingly, the rotational load of the gear can be minimized.

Figure 6:
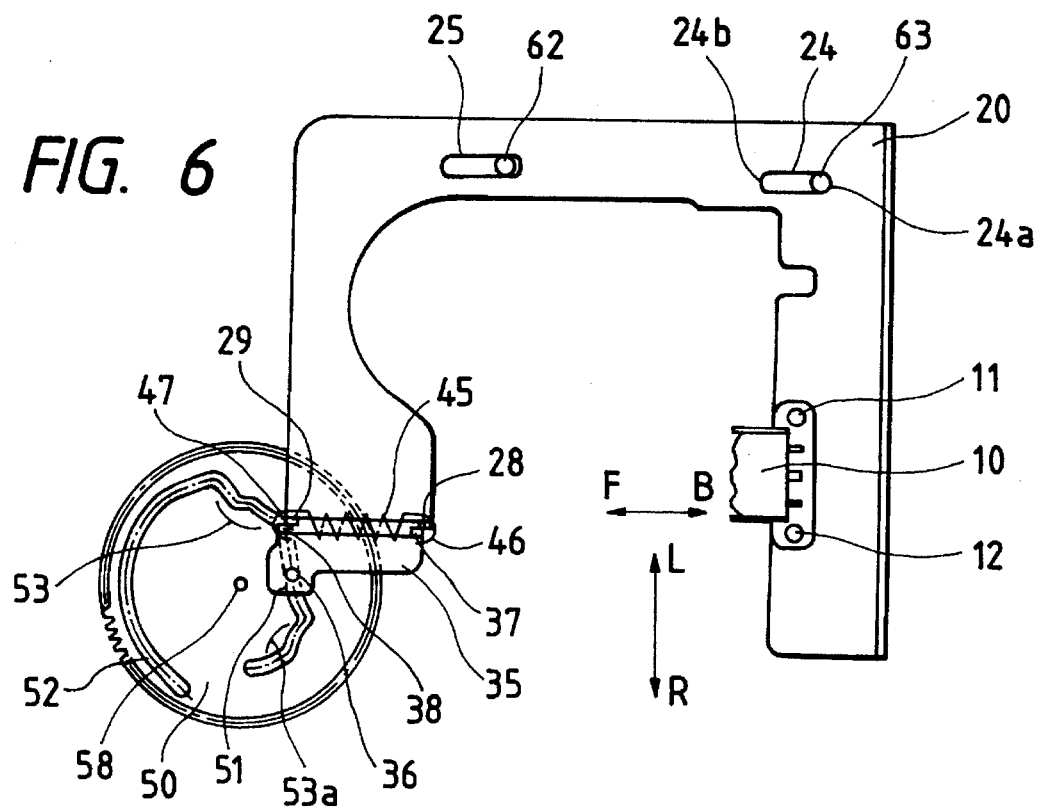
FIG. 6 is a view showing the condition of recording and playing back of another embodiment of the present invention.

At the tape recording and play back position shown in FIG. 6, the drive plate 35 is fixed by the rotary cam gear 50 at a position which is more advanced than the base plate spring hooks A 28 and B 29 adjacent to the plate spring hooks A 37 and B 38. Therefore, the magnetic head mounting base plate 20 can be pushed in the advance direction. At this time, the pushed magnetic head mounting base plate 20 is fixed when the advance stopper 24*a* comes into contact with the guide pin 63. Under this condition, the rotary cam gear 50 is given a force by the engaging pin 36 in an outer direction with respect to the rotational center 58, so that this force becomes a rotational load.

Embodiment 3

Figure 7:
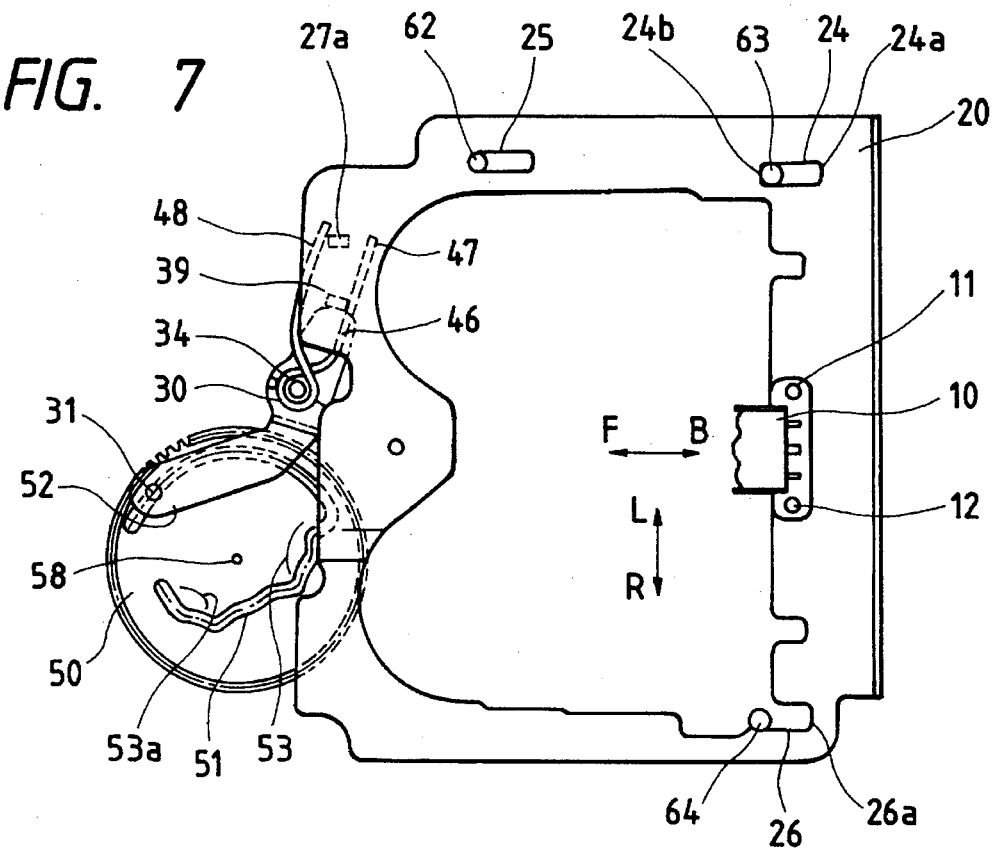
FIG. 7 is a view showing the condition of head withdrawal of another embodiment of the present invention.

FIG. 7 is a plan view showing another embodiment. Numerals 10 to 12, 20 to 26, 30, 31, 34, 50 to 53, 60 to 64 are the same as those shown in Embodiments 1 and 2. Numeral 27*a* is a post vertically provided on the magnetic head mounting base plate 20, numeral 39 is a drive spring engaging hook provided on the lever 30, numeral 46 is a drive spring hooked at the drive lever wherein the drive spring 46 is previously pushed in a direction so that its opening angle is directed in a closing direction, numeral 47 is a drive portion of the drive spring 46 used in the case of tape recording and playback operation. Numeral 48 is a drive portion of the drive spring 46 in the case of withdrawal of the head. The drive spring 46 is installed in such a manner that the post 27*a* and the hook 39 are interposed between the drive portions 47 and 48 formed into the forked construction.

In the head withdrawal condition shown in FIG. 7, when the vertically provided post 27*a* is pushed by the head withdrawal drive portion 48 of the drive spring 46 in the withdrawal direction, the magnetic head mounting base plate 20 is fixed by the contact of the withdrawal stopper 24*b* and the guide pin 63. Under the above condition, a force is given to the rotary cam gear in a direction of the gear center 58, so that the force becomes a rotational load.

Figure 8:
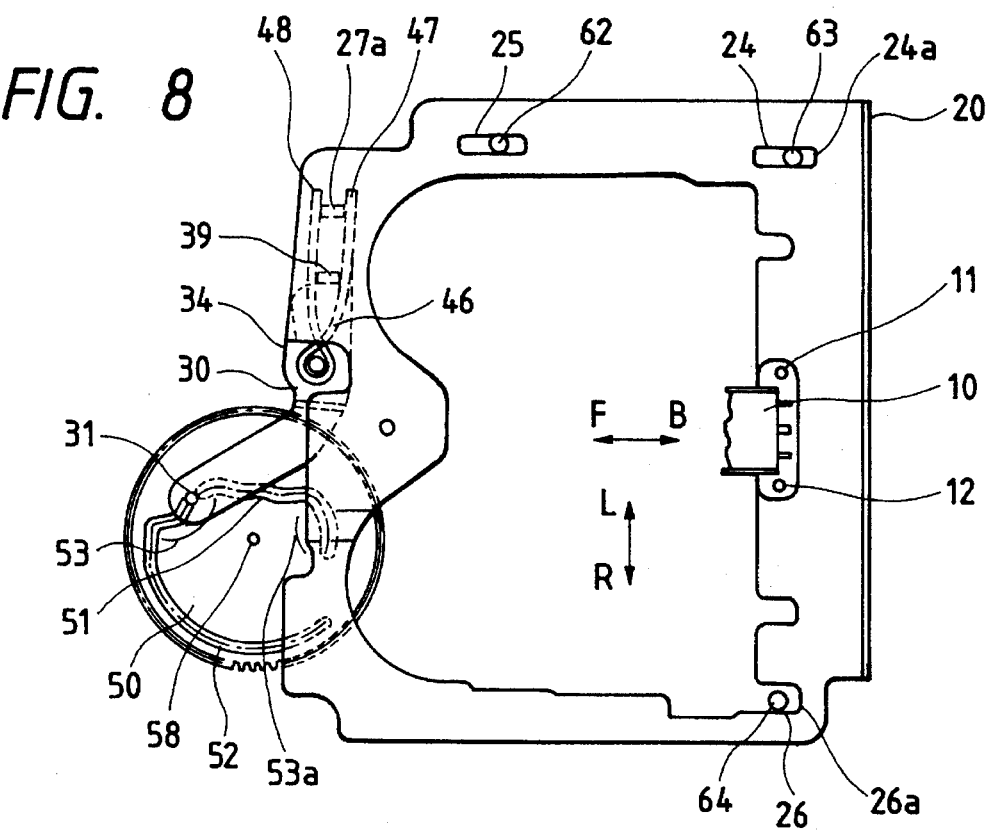
FIG. 8 is a view showing the condition of head movement of another embodiment of the present invention.

In the head movement condition shown in FIG. 8, the position of the magnetic head mounting base plate 20 is not longitudinally regulated by the guide pin. Therefore, the drive spring is in the most closed condition, so that the loads of the drive lever 30 and rotary cam gear 50 are minimized.

Figure 9:
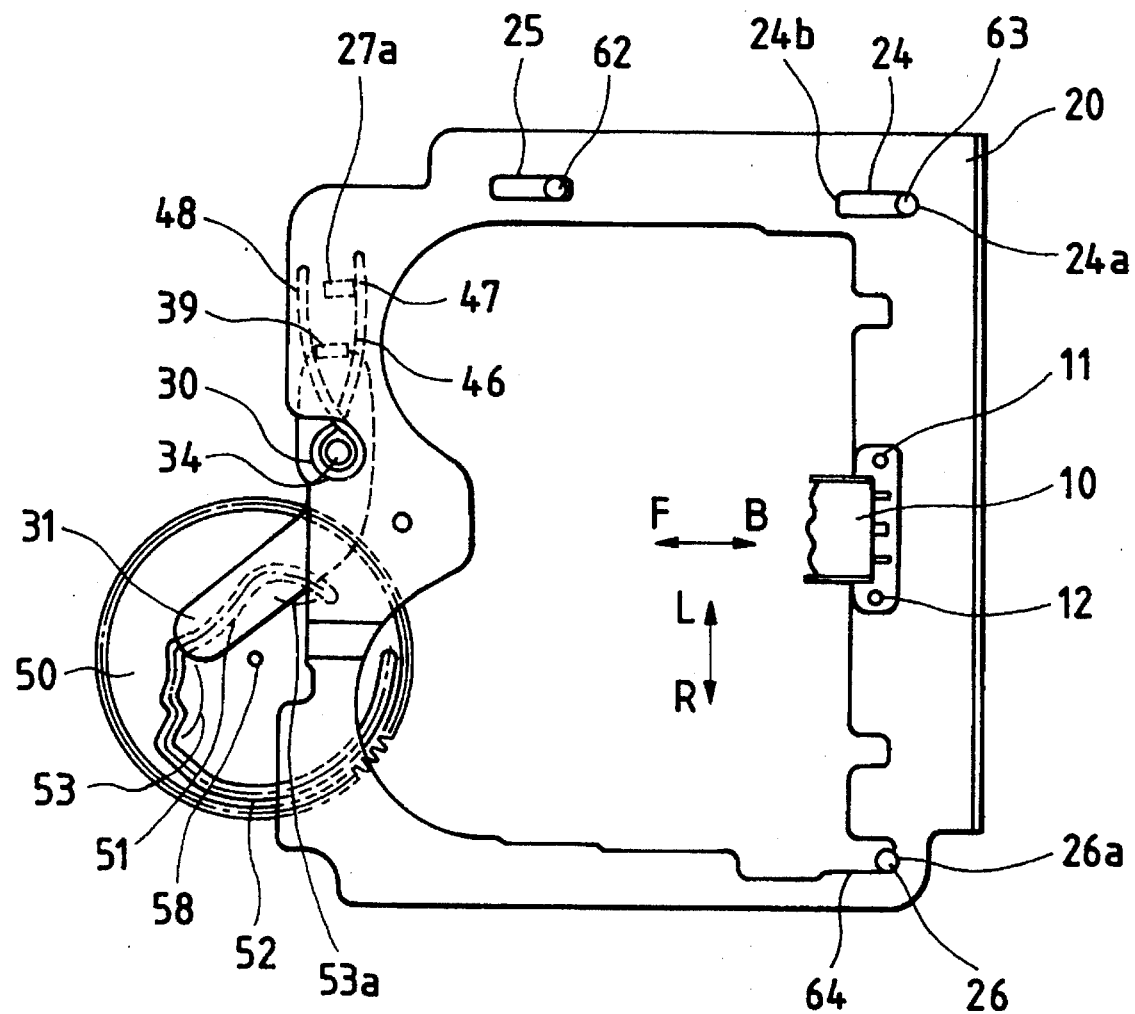
FIG. 9 is a view showing the condition of recording and playing back of another embodiment of the present invention.

In the type recording and playback condition shown in FIG. 9, when the vertically provided post 27*a* is pushed by the tape recording and playback drive section 47 of the drive spring 46 in the advance direction, the magnetic head mounting base plate 20 is fixed by the contact of the advance stopper 24*a* and the guide pin 63.

Under the above condition, a force is given to the fixed cam gear in a direction outside of the gear center 58, so that the force becomes a rotational load.

As described above, according to the present invention, the head base is positively pushed in one direction by the lever and resilient body at the time of head withdrawal and also at the time of recording and playing back a tape, and while the head base is being moved in an interval from the time of head withdrawal to the time of recording and playing back a tape, this pushing force can be reduced.

What is claimed is:

1. A magnetic tape recording and playback device into which a magnetic tape cassette may be inserted comprising:

a main base;

a head base to which a magnetic recording/playback head is attached, said head base being movable on said main base;

an actuating cam provided on said main base, for effecting movement of said head base, between an engaged position and a disengaged position, relative to said magnetic tape cassette;

a drive plate disposed laterally adjacent to said head base and engaged with said cam, said drive plate being movable in accordance with the rotation of said cam; and a resilient member engaged with both said drive plate and head base at two points located on the adjacent portions of said drive plate and said head base, such that when said cam is rotated said drive plate drives said head base in a first direction parallel to the movement direction of said drive plate through said resilient member.

2. The device according to claim 1, wherein said resilient member biases said head base relative to said drive plate so as to correct misalignment therebetween in a direction perpendicular to said movement direction.

3. The magnetic tape recording and playback device according to claim 1, wherein said resilient member is a tension spring.

4. The magnetic tape recording and playback device according to claim 3, wherein rotation of said cam causes said spring to move sequentially through states of elongation, relaxation and elongation.

5. The magnetic tape recording and playback device according to claim 1, wherein during an interval between the time of conveyance of said magnetic tape cassette into or out of said device and the time of tape recording and playback, a resilient force on said resilient member is minimized.

6. The magnetic tape recording and playback device according to claim 1, wherein said cam is a disk-shaped cam having a groove on a flat surface thereof.

7. A magnetic tape recording and playback device into which a magnetic tape cassette may be inserted, comprising:

a main base;

a head base to which a magnetic recording/playback head is attached, said head base being movable on said main base;

an actuating cam provided on said main base, for effecting movement of said head base between an engaged position and a disengaged position, relative to said magnetic tape cassette;

a resilient member engaged with said head base at two points located in the movement direction of said head base; and a drive plate disposed adjacent to said head base, engaged with both said cam and said resilient member, so as to elastically connect said head base with said cam, said drive plate being movable in a radial direction relative to said actuating cam, in accordance with rotation of said cam and in a direction parallel to the movement direction of said head base, thereby driving said head base in the movement direction.

* * * * *